UNITED STATES PATENT OFFICE.

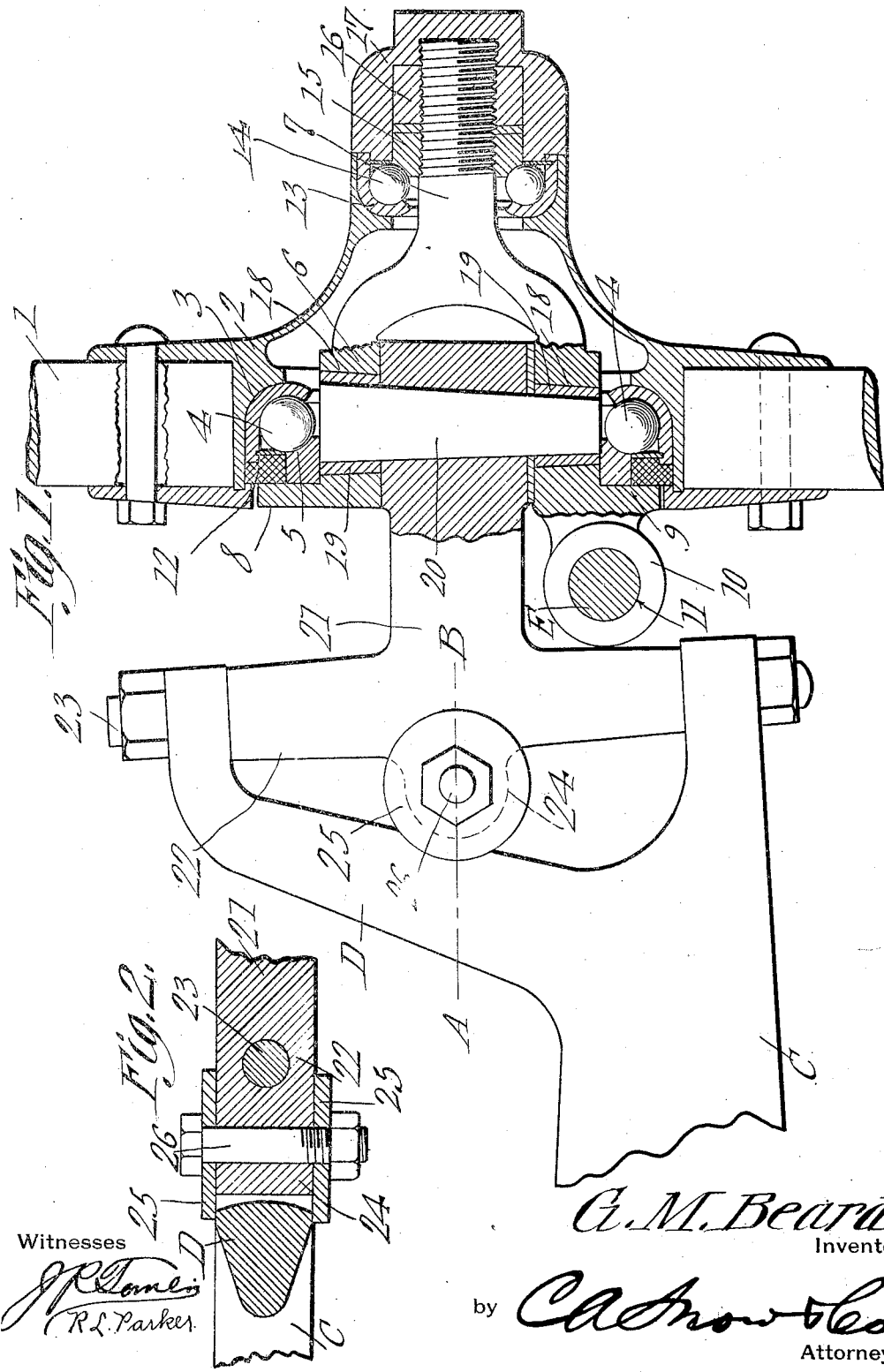

GEORGE M. BEARD, OF PLEASANT LAKE, INDIANA.

STEERING ATTACHMENT FOR MOTOR-VEHICLES.

1,178,048.  Specification of Letters Patent.  Patented Apr. 4, 1916.

Application filed September 18, 1915. Serial No. 51,415.

*To all whom it may concern:*

Be it known that I, GEORGE M. BEARD, a citizen of the United States, residing at Pleasant Lake, in the county of Steuben and State of Indiana, have invented a new and useful Steering Attachment for Motor-Vehicles, of which the following is a specification.

This invention relates to an attachment for automobiles designed to displace the front or steering wheels thereof, one of the objects of the invention being to provide an attachment of this character which can be substituted readily for the front wheel and its spindle and which, when in position, renders the steering of the vehicle much more easy than heretofore, inasmuch as the steering pivot is brought to the center of the road wheel.

A further object is to provide an attachment of this character which, when positioned upon a vehicle, will keep the road even with the hands off of the steering wheel and which will not be deflected by any obstructions in the path thereof.

Another object is to provide an attachment which eliminates the rattling produced in the bearings of the steering gear.

The improvements are especially designed for use in connection with the Ford automobile, one of the objects being to provide means whereby the structure can be quickly substituted for the movable member of a steering knuckle without marring the appearance of the vehicle, the added parts being practically concealed.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a view partly in elevation and partly in section of a portion of a wheel and the improvements combined therewith. Fig. 2 is a section on line A—B, Fig. 1.

Referring to the figures by characters of reference C designates a portion of the front axle of an automobile such as the well known Ford, this axle being provided with end yokes one of which has been shown at D.

The present improvements comprise a wheel, a portion of which has been indicated at 1, this wheel having a hub 2 provided with a ball cup 3 therein intersecting the plane of the center of the wheel tread. The anti-friction balls 4 which engage the cup 3 likewise engage a cone 5 which extends around a yoke 6 having a threaded stem 7 projecting laterally. The cone abuts against an upstanding flange 8 on the inner end of the yoke 6 and against a depending flange 9 upon the lower portion of the yoke, there being an ear 10 extending inwardly from the lower portion of the yoke and provided with an opening 11. A felt ring 12 is arranged between the cup 3 and the periphery of the cone 5 and serves to prevent the admission of dust to the bearing.

The hub 2 houses that portion of the yoke 6 adjacent the stem 7 and receives a cup 13 engaged by anti-friction balls 14. A cone 15 is mounted on the stem 7 and bears against the balls 14 and this cone is held in place by a lock nut 16 and a cap 17, the said nut and cap engaging the threaded portion of the stem 7 as shown.

Formed within the upper and lower portions of the yoke 6 are openings 18 in which are seated bushings 19. A tapered pin 20 is mounted for rotation in these bushings and is engaged by a spindle 21 which fits snugly within the yoke. This spindle projects laterally from a sleeve 22 which is adapted to be mounted within the yoke D, it being held in place by the bolt 23 extending through the sleeve and the yoke. The sleeve 22 has an ear 24 and holding washers 25 are adapted to be clamped against the side faces of this ear by a bolt 26, these washers lapping the sides of the yoke D as shown particularly in Fig. 2, thus to hold sleeve 22 against rotation upon the bolt 23.

When it is desired to attach a structure such as herein described to the front axle of a Ford automobile, the movable member of the steering knuckle is removed by withdrawing the bolt 23 from the yoke D and by unfastening the steering rod. Sleeve 22, with the wheel 1 in position on the spindle 21, is then inserted in the yoke D and the bolt or pin 23 reinserted in the yoke D and through the sleeve 22. Washers 25 are then placed at opposite sides of the ear 24 and fastened by means of a bolt 26 so that the sleeve 22 is thus held against rotation on bolt 23. The steering rod indicated at E is then fastened in the opening 11 whereupon the structure is ready for use.

It will be seen that by utilizing a structure such as described the wheel is held practically the same distance from the axle as ordinarily, but is an improvement over the usual structure in that said wheel, during the steering operation, will rotate about an axis extending through the center of the wheel. This obviously enables the wheels to be operated much more readily than otherwise and is further advantageous because the wheels will ride over obstructions without being deflected laterally and will even travel straight ahead on a level road while the hands of the driver are disengaged from the steering gear. Furthermore the rattling which has heretofore been present is avoided with the new arrangement of parts.

The wheel 1, sleeve 22, and the connections between the sleeve and the wheel are all placed on the market as an attachment and it will be obvious that the same can be readily substituted for the usual movable knuckle member, without requiring the services of a skilled mechanic.

What is claimed is:—

1. An attachment of the class described, including a sleeve, a spindle extending therefrom, a yoke pivotally mounted on the spindle, a wheel mounted for rotation on the yoke, the axis of movement of the yoke being in the plane of the center of the wheel tread, and means extending from the yoke for connection with a steering means.

2. An attachment of the class described, including a sleeve, a spindle extending therefrom, a yoke pivotally mounted on the spindle, a wheel mounted for rotation on the yoke, the axis of movement of the yoke being in the plane of the center of the wheel tread, means extending from the yoke for connection with a steering means, and means upon the sleeve for engaging an axle to hold the sleeve against rotation.

3. An attachment of the class described, including a yoke having a stem, a spindle projecting into the yoke, a pivot pin extending downwardly through the yoke and spindle, a wheel mounted for rotation on the stem and yoke, the longitudinal center of the wheel tread being disposed in the same plane with the center of said pin, and means for securing the spindle in an axle yoke.

4. An attachment of the class described, including a yoke having a stem, a spindle projecting into the yoke, a pivot pin extending downwardly through the yoke and spindle, a wheel mounted for rotation on the stem and yoke, the longitudinal center of the wheel tread being disposed in the same plane with the center of said pin, and means for securing the spindle in an axle yoke, said means including a sleeve integral with the spindle, and insertible into the axle yoke, a fastening member extending longitudinally within the sleeve for engagement with the yoke, and means upon the sleeve for engaging the sides of the axle yoke.

5. The combination with an axle having a yoke, and a bolt extending downwardly through the yoke, of a sleeve mounted on said bolt, means upon the sleeve and coöperating with the yoke for holding the sleeve against rotation, a spindle extending from the sleeve, a yoke straddling the spindle, a pivot pin extending downwardly through the spindle and the yoke adjacent thereto, a wheel mounted for rotation about the spindle and the yoke mounted thereon, the axis of said pin being in the plane of the center of the wheel tread, and means upon the yoke in the wheel for engaging a steering member.

6. An attachment of the class described, including a sleeve, a spindle extending therefrom, means on the sleeve for engaging an axle yoke to hold the sleeve against rotation relative to the axle yoke, and a wheel extending around the spindle and mounted to swing about a central vertical axis, and means for swinging the wheel about said axis during the rotation of the wheel.

In testimony that I claim the foregoing as my own, I have hereto affixed my signature in the presence of two witnesses.

GEORGE M. BEARD.

Witnesses:
ANTRIS A. BEARD,
MAURINE BEARD.